United States Patent [19]

Daar et al.

[11] Patent Number: 5,301,308
[45] Date of Patent: Apr. 5, 1994

[54] METHOD FOR SYNCHRONIZING REDUNDANT OPERATION OF COUPLED DATA PROCESSING SYSTEMS FOLLOWING AN INTERRUPT EVENT OR IN RESPONSE TO AN INTERNAL COMMAND

[75] Inventors: Horst Daar, Erlangen; Herbert Barthel, Herzogenaurach, both of Fed. Rep. of Germany

[73] Assignee: Siemens Aktiengesellschaft, Munich, Fed. Rep. of Germany

[21] Appl. No.: 513,663

[22] Filed: Apr. 24, 1990

[30] Foreign Application Priority Data

Apr. 25, 1989 [EP] European Pat. Off. ........ 89107476.7

[51] Int. Cl.$^5$ .................... G06F 11/16; G06F 9/40
[52] U.S. Cl. ...................... 395/575; 371/8.1; 371/9.1; 364/187; 364/263.2; 364/262.5; 364/268.4; 364/DIG. 1
[58] Field of Search ............ 395/800, 575; 371/4, 371/7, 8.1, 9.1; 364/187

[56] References Cited

U.S. PATENT DOCUMENTS

| | | | |
|---|---|---|---|
| 3,623,014 | 11/1971 | Doetz et al. | 371/9.1 X |
| 3,678,463 | 7/1972 | Peters | 364/200 |
| 3,800,294 | 3/1974 | Lawlor | 340/172.5 |
| 3,810,119 | 5/1974 | Zieve et al. | 340/172.5 |
| 4,377,000 | 3/1983 | Staab | 371/11 |
| 4,569,017 | 2/1986 | Renner et al. | 364/200 |
| 4,589,066 | 5/1986 | Lam et al. | 364/200 |
| 4,639,852 | 1/1987 | Motomiya | 371/8.1 X |
| 4,691,300 | 9/1987 | Pelley, III et al. | 365/200 |
| 4,733,353 | 3/1988 | Jaswa | 364/200 |
| 4,755,995 | 7/1988 | Anderson et al. | 371/9.1 |
| 4,783,731 | 11/1988 | Miyazaki et al. | 364/200 |
| 4,803,613 | 2/1989 | Kametani et al. | 364/132 |
| 4,807,121 | 2/1989 | Halford | 364/200 |
| 4,816,990 | 3/1989 | Williams | 364/200 |
| 4,833,598 | 5/1989 | Imamura et al. | 364/200 |
| 4,901,230 | 2/1990 | Chen et al. | 364/200 |
| 4,937,741 | 6/1990 | Harper et al. | 364/200 |
| 4,958,270 | 9/1990 | McLaughlin et al. | 367/187 |
| 4,967,347 | 10/1990 | Smith et al. | 364/200 |
| 5,008,814 | 4/1991 | Mathur | 395/200 |

Primary Examiner—Thomas C. Lee
Attorney, Agent, or Firm—Kenyon & Kenyon

[57] ABSTRACT

The system synchronizes data processing systems coupled together using a synchronization operation that is only implemented as a function of events that necessitate synchronization. The system differentiates between the immediate synchronization of internal commands and the indirect synchronization of interrupt events. When an internal command appears, then the synchronization of the data processing systems takes place immediately after the command is executed. In the case of interrupt events, the synchronization operation takes place at defined program points such as block limits or program sections of programs so partitioned.

15 Claims, 2 Drawing Sheets

METHOD FOR SYNCHRONIZING REDUNDANT OPERATION OF COUPLED DATA PROCESSING SYSTEMS FOLLOWING AN INTERRUPT EVENT OR IN RESPONSE TO AN INTERNAL COMMAND

FIELD OF THE INVENTION

This invention relates to the field of data processing systems and, more particularly, to data processing systems that work in synchronism with each other and are used, for example, as automating devices for the redundant control of industrial processes.

BACKGROUND OF THE INVENTION

For complex data processing systems which are coupled together, the operating speeds of the individual data processing systems may vary. Therefore to synchronize the systems, it is not sufficient enough to merely start the program runs simultaneously. Rather, steps must be taken to ensure synchronization throughout the duration of time in which the program is running.

German Published Patent Application 36 33 953 discloses the use of two identical program runs in a program-controlled automating device having a redundant set up using two subsystems. The device implements a reciprocal synchronization of the program runs from the operating system at the beginning of certain program sections.

When the identical programs are subdivided into program sections, it sometimes becomes necessary to only synchronize the data processing systems at later points in time rather than at the beginning of a new program section, or to synchronize even before the beginning of the next new program section.

There is therefore needed a method for synchronizing data processing systems, whereby a synchronization operation is only undertaken when necessary to provide program synchronism for the data processing systems.

SUMMARY OF THE INVENTION

In accordance with the invention, this need is met by a method for synchronizing at least two data processing systems that are interconnected by a communication device. Each of the data processing systems have an identical control program providing for redundant operation.

The identical control program comprises an operating system as well as a user program and is able to be subdivided into program blocks having preselectable block limits.

In the present invention, the data processing systems are arranged as redundant data processing systems, having identical control programs. The redundant data processing systems recognize interrupt events that require an indirect synchronization.

Each redundant data processing system, which recognizes an interrupt event during a program run, services the program block up to the following block limit and subsequently is synchronized with the remaining redundant data processing systems. The synchronization operation can be undertaken via the communication device.

The identical control program can also feature commands requiring an immediate synchronization. These commands are also defined as "internal commands". The synchronization procedure is advantageous for internal commands, whereby each data processing system which shares in the redundant operation and decodes an internal command first before another redundant data processing system, remains in a standby condition until all of the data processing systems participating in the redundant operation have likewise processed the internal command.

When interrupt events requiring an indirect synchronization are recognized by the redundant data processing systems and when the identical control programs feature internal commands requiring immediate synchronization, then a combination of the described synchronization procedures is recommended. In this case, each redundant data processing system recognizing an interrupt event during the program run services the active program block up until the following block limit. The redundant data processing system is subsequently synchronized with the remaining redundant data processing systems. Each redundant data processing system which decodes an internal command earlier than another redundant data processing system remains in the standby condition until at least one of the remaining redundant data processing systems has likewise processed the internal command.

This procedure can be advantageously used for at least two redundant data processing systems. Each system having an identical, assigned input-output unit that can be operated by means of the commands in the identical control program of a specific data processing system. This makes a redundant dual-channel mode possible, such as that for a process control system.

Identical input-output units automatically recognized by a data processing system can be reported to the user, for example, using a visual display terminal. By making a yes/no decision, the user can then decide whether to accept the identical input-output units as redundant units by means of the identical control programs.

A further embodiment of the invention provides a redundant, single-channel mode in which an input-output unit is assigned to at least two redundant data processing systems. This input-output unit can be operated by means of the commands of the identical control programs of either data processing system.

It is advantageous during the servicing of the identical control program, by means of the two data processing systems, for one of the data processing systems to assume the process control and for the other data processing system to participate in a redundant manner with the process control. In the single-channel mode of op ..ion, the process-controlling data processing system effects the control of the process and the other redundant data processing systems passively assume the process states. The other data processing systems are thus continuously provided with the actual data, i.e. the process image, of the process. In the dual-channel mode, the synchronization monitoring, for example, can be performed by the process-controlling data processing system. In both modes, it is possible to pass the process control over to a redundant data processing system at any time without interrupting or disturbing the process.

A further advantage of the invention is that the operator can provide input to one data processing system, the input containing a modification of the user program, during the operation of this data processing system. The operator's inputs are automatically transmitted to all further data processing systems in operation.

Further, the control program can advantageously be modified according to the following steps: 1) a redundant data processing system is uncoupled from the remaining data processing systems; 2) the control program is modified on the uncoupled data processing system; 3) the uncoupled data processing system is then again coupled to the remaining data processing systems and receives the active data of the process-control or redundant data processing system; and 4) the data processing system with the modified control program performs the process control.

If a data processing system has to be replaced, e.g. due to a necessary repair, the following process steps are performed: 1) if the data processing system to be replaced is performing process control, the process control is then transferred to a redundant data processing system; 2) the data processing system to be replaced is uncoupled from the remaining data processing systems; 3) the data processing system to be exchanged is coupled to the remaining data processing systems; 4) the redundant hardware and software of the exchanged data processing system are compared to the redundant hardware and software of a remaining redundant data processing system; 5) the actual data of the process-controlling or redundant data processing system is automatically assumed and the exchanged data processing system automatically participates in the operation only if there is parity with the redundant hardware and software; and 6) if there is disparity between the redundant hardware and software, an error message is generated.

When implementing operator generated inputs, which may modify the user program as well as the control program, and when replacing a data processing system as described above, the present invention ensures that the controlled process is not interrupted or disturbed in any manner. This achieves a high degree of availability for the process-controlling data processing system.

A further increase in the availability of the data processing systems is achieved in that the system relinquishes control of the actual data which is taken over by another data processing system. This occurs for instance, after equipment has been replaced. The quantity of data to be transmitted is projected by the user and the moment of data acceptance is controlled by the user program. In this manner, time-consuming data communication can be carried out in the undisturbed phases of the process control.

DETAILED DESCRIPTION

Figure 1:
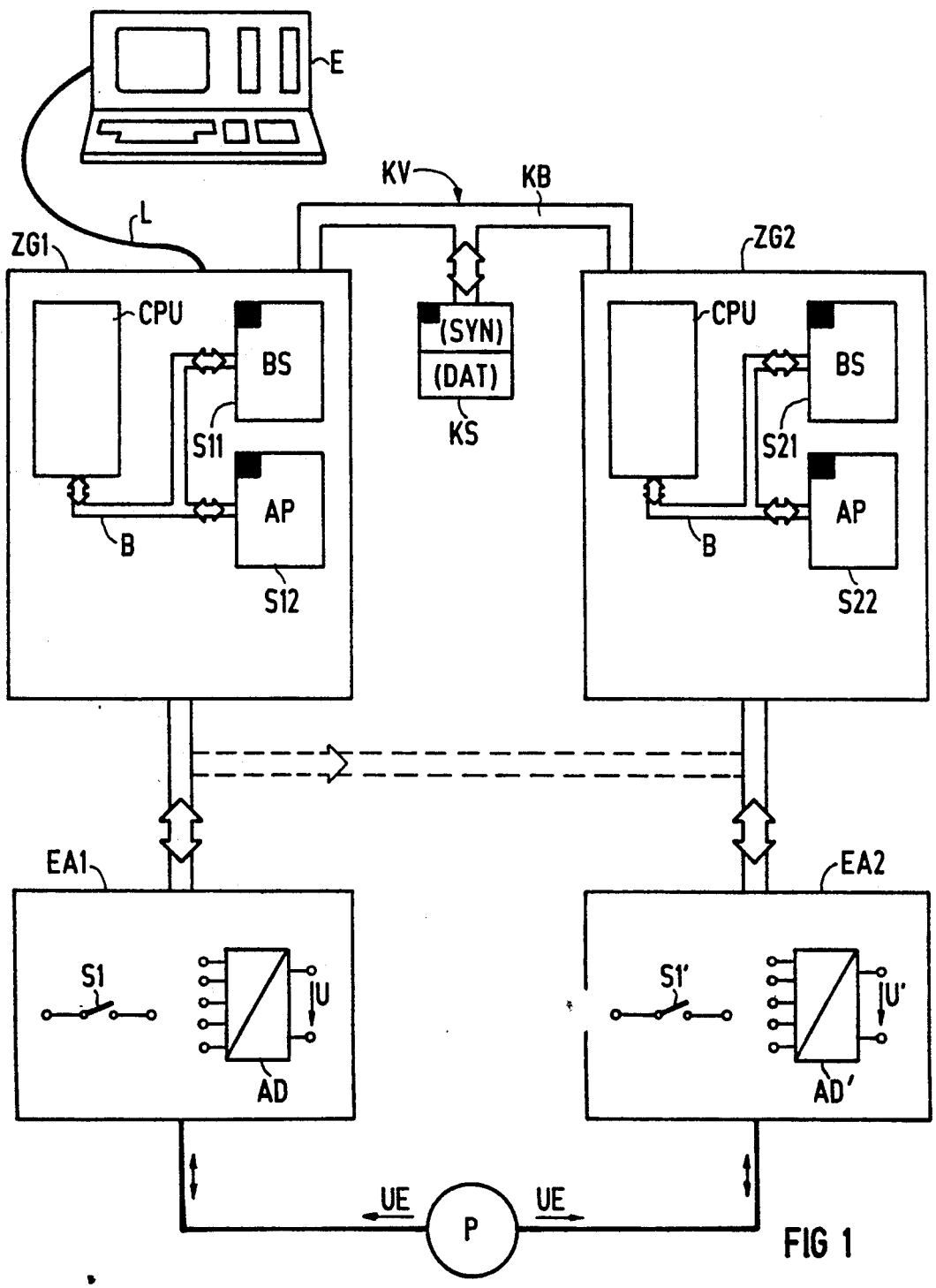
FIG. 1 is a block diagram of two data processing systems in a dual-channel, redundant process control, configuration.

FIG. 1 shows two data processing systems ZG1, ZG2 in a dual-channel, redundant process control configuration for a process P. The two data processing systems include an input device E and a first and a second central unit ZG1, ZG2. The first central unit ZG1 is coupled via a line L to the input device E.

The terms "data processing system" and "central unit" are used interchangeably in the following discussion. A data processing system as used and defined in this specification can be an elementary functional unit for processing data or it can also be a computer having all known basic components, for example, input-output devices, mass storage units, etc.

The two central units ZG1, ZG2 are interconnected via a communication device KV, including for example a communication bus KB and a communication memory KS. The communication bus KB can be, for example, a parallel or a serial bus. The communication device KV may also contain further elements, for example, modules for controlling the data flow on the communications bus KB, etc. All of the elements of the communication device KV, with the exception of the communication bus KB, could also be components of one of the central units ZG1, ZG2.

For each of the central units ZG1, ZG2, FIG. 1 symbolically represents those components that are important for the description of the invention. The components are identically represented for both central units ZG1, ZG2. Each central unit ZG1, ZG2 comprises a central unit CPU and two memory modules S11, S12 or S21, S22 respectively. The memory modules S11, S21 each contain the operating system BS; and the memory modules S12, S22 each contain the current user program AP. It should be understood, however, that it is not necessary to divide the operating system BS and the user program AP into two memory modules S11, S12 or S21, S22. Both programs BS, AP could equally be accommodated in only one memory module or in several memory modules. A bus system B in each central unit ZG1, ZG2 couples the respective central unit CPU with the memory modules S11, S12 or S21, S22. The data flow direction on the bus system B is represented by arrows. It is obvious from the indicated data flow direction both to and from the memory modules S11 or S21 containing the operating system BS, that these memory modules S11, S21 can be designed as read/write memories. It is not necessary for the operating system BS to be a permanent component of each central unit ZG1, ZG2. The operating system BS can also be input into the system by the respective user via the input device E and, in the same manner, via the user program AP. To provide program and data inputs and/or modifications thereto, it suffices to couple the input device E solely to one of the central units ZG1 or ZG2, since the programs AP, BS contained in one of the central units ZG1, ZG2 can automatically be transmitted via the communication device KV to the other central unit ZG2, ZG1. In this manner, the user can operate a group of several data processing systems ZG1, ZG2 as a single unit.

Each data processing system is coupled via its assigned input-output unit EA1, EA2 to a shared process P. The process P is provided with redundant digital and analog control devices and transducers, which are symbolized in the respective blocks of the input-output units EA1, EA2 by the switches S1 or S1' and the analog-to-digital converters as blocks AD or AD'.

Figure 2:
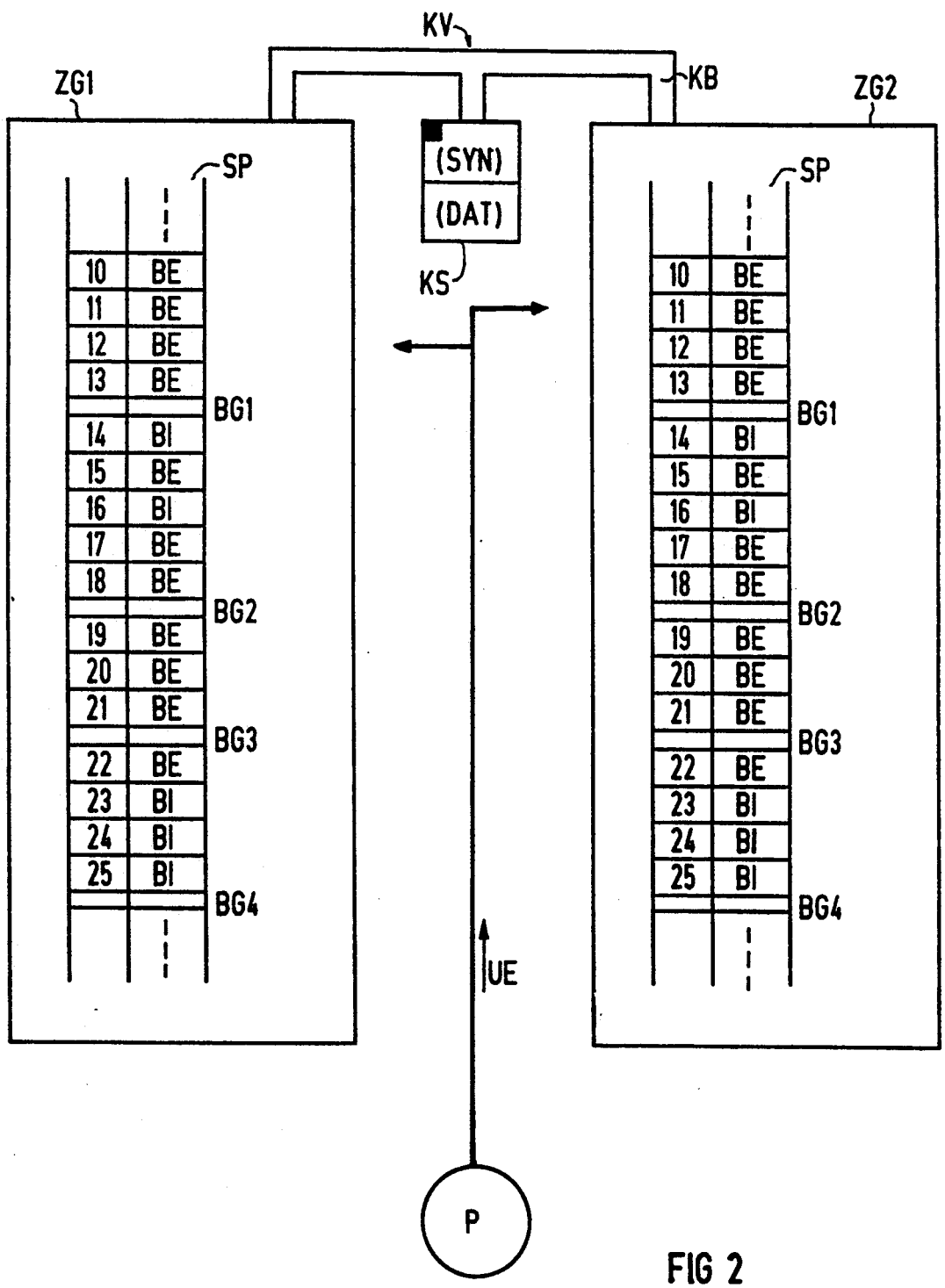
FIG. 2 is a schematic representation of the identical control programs of the data processing systems.

For the redundant control of the process P, the central units ZG1, ZG2 contain an identical control program SP shown in FIG. 2, that is composed of parts of the operating system BS and of the user program AP. The identical control programs SP contain, at a minimum, specifiable synchronization points. Such synchronization points can be defined as block limits BG1 ... BG4 (FIG. 2) located at the beginning or the end of a respective program section.

Each central unit ZG1, ZG2 is able to implement independent data processing tasks by making use of the remaining nonidentical portions of the control program.

These independent tasks could be performed, for example, during the time intervals in which no redundant operation takes place. Alternatively, the independent tasks could be performed, for example, in a multitasking operation. For this purpose, the central units ZG1, ZG2 could be coupled to other data processing systems and input-output devices via the communication device KV or via a further communication device, for instance, a common bus system (not shown). Of course, other data processing systems or central units could also participate in the redundant control of a process, and these systems or units would likewise have to be coupled to the remaining, redundant, central units ZG1, ZG2 via the communication device KV.

To effect the redundant control of the process P, each identical control program SP (FIG. 2) in the central units ZG1, ZG2 begins running at the same time. However, in actual practice for example, the clock-pulse cycles of the data processing systems are not absolutely synchronized, and the program runs are thus subject to time displacements. So long as commands not requiring synchronization of both central units ZG1, ZG2 are being executed during the program run, the time displacement of the program runs is tolerable and a synchronization operation is not necessary. However, during control of the process P, events requiring an indirect synchronization of the central units ZG1, ZG2 can occur. These events are termed "interrupt events" UE in the following description. Such interrupt events UE can be, for example, process and time alarms. The occurrence of an interrupt event is detected by the central units ZG1, ZG2 and results in the servicing of the currently running program section until the following block limit is reached BG1 . . . BG4 (FIG. 2). It also results in the central units ZG1, ZG2 being synchronized at the following block limit BG1 . . . BG4 (FIG 2).

Both central units ZG1, ZG2 can advantageously be synchronized via the communication device KV. The respective central unit ZG1, ZG2 that reaches its respective block limit BG1 . . . BG4 (FIG. 2) first, or the process-controlling central unit ZG1, ZG2, files the status message "synchronization point reached" in the synchronization memory location (SYN) of the communication memory KS coupled to the communications bus KB. This is assuming that the process-controlling system is the central unit ZG1. An interrupt event UE is signaled from the process P to the central units ZG1, ZG2 via the two input-output modules EA1, EA2. If the central unit ZG1 was the first to reach the following block limit BG1 in the actively processed program section of the control program SP, it then signals this to the memory location (SYN) and then remains in the standby condition. Shortly thereafter the central unit ZG2 will also reach the block limit BG1. The central unit ZG2 will then check, via the communication device KV, if the message "synchronization point reached" from the central unit ZG1 is stored. If the message is available, then both central units continue with the execution of the next program section. If the central unit ZG2 reaches the block limit BG1 first, it remains in standby condition until an inquiry for the status message indicates a positive result.

During control of the process P, events can also occur that require an immediate synchronization of the central units ZG1, ZG2. Such events are, for example, an access to the process interface system, an inquiry of timer locations, etc. These events are characterized in that they are initiated by the identical control program SP and result in immediate modifications of the process image in the data processing system. For this reason, these events are designated in the following description as "internal events" initiated by internal commands BI (FIG. 2).

To process the internal commands BI, an appropriate subroutine can be provided. Alternatively, the microprogram responsible for decoding the commands or the command interpreter of a respective central unit CPU are expanded accordingly.

If the internal command BI is recognized by the respective central unit ZG1, ZG2, then further execution of the current program section of the identical control program SP is immediately interrupted. Once a synchronization point is reached by the central unit, as described above with respect to interrupt events UE, the "synchronization point reached" signal is communicated via the communication device KV to the remaining participating central units ZG1, ZG2. If actual data for the respective central unit ZG1, ZG2 is modified by an internal command BI, such as by the internal command BI making a new calculation of a specific value, then the new data (DAT) can also be transmitted to the communication memory KS simultaneously with the status message that the synchronization point has been reached. The central unit ZG2 then queries the attainment of the synchronization point of the central unit ZG1 and checks the modified new data to see if it equals the result of its own calculation.

If several central units ZG1, ZG2 or data processing systems participate in the redundant control of the process P, then it is necessary to enable the remaining data processing systems to determine whether a synchronization point for a respective data processing system has been reached. For this purpose, a memory location (SYN) for storing the synchronization status message is provided for each data processing system in the communication memory KS. This step is known from customary, "handshaking" operations.

As indicated in FIG. 1 by the dotted line connection between the central unit ZG2 and the input-output unit EA1, redundant operation of the two central units ZG1, ZG2 can also occur in a single-channel mode. In this instance, the process control for the process P would only be carried out from the central unit ZG1 via the input-output unit EA1. The central unit ZG2 only assumes the process data via the coupling with the input-output unit EA1 in its passive mode of operation and is thus always provided with a current process image. This allows the central unit ZG2 to assume the active process control at any time. In this manner, however, no differences result with respect to the synchronization.

FIG. 2 shows a cutaway portion of the identical control programs SP of the central units ZG1, ZG2. The identical control programs SP are each divided into program sections of various lengths, which are separated from each other by the block limits BG1 . . . BG4.

The subdivision of the program sections can therefore be specified, for example, by the user. Likewise, the subdivisions can be software-controlled through automatic structuring. In customary automating devices, for example, the programs, in the form of individual program modules, are grouped together at the start. The commands BE and the internal commands BI occupy the memory locations 10 to 25 in each of the identical control programs SP. The process P to be controlled is depicted with a circle.

An interrupt event UE generated from process P interrupts the central units ZG1, ZG2 as shown via the thick solid arrows extending from the process P. The arrows illustrating the interrupt signal are offset from one another to indicate that the interrupt event UE reaches the central unit ZG1 at an instant of time in which the control program SP, running in ZG1, is operating on command BE in memory location 12. Further, the interrupt event UE reaches the identical control program SP of the central unit ZG2, which is only operating on command BE in memory location 11.

Accordingly, the central unit ZG1 will be the first to reach the block limit BG1 and to file the synchronization status message (SYN) in the communication memory KS, in order to then remain in the standby condition. When the central unit ZG2 has likewise reached the block limit BG1, it queries the synchronization status message of the central unit ZG1 via the communication device KV, and both units begin to execute the next program section, i.e. from BG1 to BG2.

In the identical control programs SP, internal commands BI are situated at memory locations 14, 16 and 23 to 25. When the respective internal control program reaches one of the internal commands BI, the rest of the program run is immediately interrupted at this location and the synchronization scheme is implemented as discussed above based on FIG. 1.

During the operation of the system, operator inputs, which may contain a modification of the user program can be made at the central unit ZG1 or at the central unit ZG2. When several central units or data processing systems participate in the redundant operation, operator inputs can be made at any one of these data processing systems or central units, without disturbing or adversely affecting the process operation. By means of the identical control programs SP, this data can then be transmitted automatically via the respective communication device KV to the remaining data processing systems or central units.

What is claimed is:

1. A method for synchronizing the operation of at lest two data processing systems coupled via a communications device, wherein the data processing systems include identical control programs for redundant operation, the method comprising the steps of:
   a) subdividing the identical control programs into program blocks having predetermined block limits between adjacent ones of the program blocks, the identical control programs including an operating system and a user program;
   b) recognizing an interrupt event in the data processing systems during a program run of the identical control programs and requiring a synchronization of the data processing systems when the interrupt event is recognized;
   c) servicing a program block currently running in the data processing systems until a next one of said predetermined block limits is reached in the identical control programs for each data processing system recognizing the interrupt event; and
   d) subsequently synchronizing each data processing system recognizing the interrupt event with the remaining data processing systems wherein the synchronizing is performed via the communications device.

2. The method according to claim 1, further comprising the steps of:
   e) assigning an identical input-output unit to each of said data processing systems;
   f) operating the input-output units using the identical control program in one of the data processing systems.

3. The method according to claim 2, further comprising the step of:
   g) treating the identical input-output units as redundant input-output units by the identical control program of one or more of the data processing systems in-response to an input from an operator.

4. A method according to claim 1, further comprising the steps of:
   e) assigning a single identical input-output unit to at least two of said data processing systems; and
   f) alternately operating the single input-output unit with the identical control program of each of the at least two of said data processing systems.

5. A method according to claim 1, wherein the at least two data processing systems perform control of a process and wherein the servicing step comprises the steps of:
   a) assuming the control of the process by one of the data processing systems; and
   b) redundantly participating in the control of the process by the other data processing systems.

6. A method according to claim 5 wherein one of said data processing systems can be replaced by:
   transferring the control of the process from the one data processing system to a redundantly participating data processing system;
   uncoupling the one data processing system from the remaining data processing systems;
   coupling an exchanged data processing system including hardware and software to the other data processing systems;
   comparing the exchanged data processing system's hardware and software to that of a redundantly participating data processing system for parity;
   automatically assuming in the exchanged data processing system actual data of either a process controlling or a redundantly participating data processing system;
   participating in the operation with the exchanged data processing system only if the comparing step determines parity; and
   generating an error message if parity is not found.

7. A method according to claim 1 further comprising the steps of:
   providing operator generated inputs to one of the data processing systems during operation thereof, the generated inputs modifying the user program; and
   automatically transmitting the operator generated inputs to the other data processing systems in operation.

8. A method according to claim 5 wherein the identical control program is modified by:
   uncoupling one of the redundantly participating data processing systems from the other data processing systems;
   modifying the identical control program on the one redundantly participating data processing system;
   coupling the one redundantly participating data processing system to the other data processing systems and receiving actual data from either a process controlling or other redundantly participating data processing system; and assuming the control of the process with the one redundantly participating data processing system.

9. A method according to claim 8 wherein the step of receiving the actual data comprises the steps of:
planning the quantity of actual data to be received; and
specifying with the user program the time of the actual data receipt.

10. A method according to claim 1, further comprising the steps of:
e) generating a status message by a first of the data processing systems, said status message indicating that said next one of said predetermined block limits has been reached in the identical control program of said first of the data processing systems; and
f) performing said step (d) only when the identical control program of at least a second of said data processing systems has reached said next one of said predetermined block limits and if said status message has been generated.

11. A method for synchronizing the operation of at least two data processing systems coupled via a communications device, wherein the data processing systems include identical control programs for redundant operation, the method comprising the steps of:
a) subdividing the identical control programs into program blocks having predetermined block limits between adjacent ones of the program blocks, the identical control programs including an operating system and a user program, and further including internal commands requiring an immediate synchronization of the data processing systems; said data processing systems recognizing interrupt events in the data processing systems during a program run of the identical control programs, the interrupt events requiring a synchronization of the data processing systems;
b) synchronizing the data processing systems via the communications device in one of the following manners:
  i) servicing the program block currently running in the data processing system until a next one of the predetermined block limits for each data processing system recognizing an interrupt event is reached, thereby subsequently synchronizing each data processing system recognizing the interrupt event with the remaining data processing systems;
  ii) decoding one of the internal commands by one of the data processing systems prior to decoding the one internal command by another of the data processing systems and entering the one data processing system into a standby condition until another data processing system decodes the one internal command.

12. A method according to claim 11, wherein the at least two data processing systems perform control of a process and wherein the servicing step comprises the steps of:
a) assuming the control of the process by one of the data processing systems; and
b) redundantly participating in the control of the process by the other data processing systems.

13. A method according to claim 12 wherein the identical control program is modified
uncoupling one of the redundantly participating data processing systems from the other data processing systems;
modifying the identical control program on the one redundantly participating data processing system;
coupling the one redundantly participating data processing system to the other data processing systems and receiving actual data from either a process controlling or other redundantly participating data processing system; and
assuming the control of the process with the ne redundantly participating data processing system.

14. A method according to claim 13 wherein the step of receiving the actual data comprises the steps of:
planning the quantity of actual data to be received; and
specifying with the user program the time of the actual data receipt.

15. A method according to claim 12 wherein one of said data processing systems can be replaced by:
transferring the control of the process from the one data processing system to a redundantly participating data processing system;
uncoupling the one data processing system from the remaining data processing systems;
coupling an exchanged data processing system including hardware and software to the other data processing systems;
comparing the exchanged data processing system's hardware and software to that of a redundantly participating data processing system for parity;
automatically assuming in the exchanged data processing system actual data of either a process controlling or a redundant data processing system;
participating in the operation with the exchanged data processing system only if the comparing step determined parity; and
generating an error message is parity is not found.

* * * * *